US011859771B2

(12) United States Patent
Wilson

(10) Patent No.: US 11,859,771 B2
(45) Date of Patent: Jan. 2, 2024

(54) METHOD AND SYSTEM FOR SUPPLYING LIQUEFIED GAS

(71) Applicant: Cryostar SAS, Hesingue Grand Est (FR)

(72) Inventor: Neil Wilson, Chalfont St Giles (GB)

(73) Assignee: CRYOSTAR SAS, Hesingue (FR)

( * ) Notice: Subject to any disclaimer, the term of this patent is extended or adjusted under 35 U.S.C. 154(b) by 819 days.

(21) Appl. No.: 16/965,083

(22) PCT Filed: Jan. 22, 2019

(86) PCT No.: PCT/EP2019/051490
§ 371 (c)(1),
(2) Date: Jul. 27, 2020

(87) PCT Pub. No.: WO2019/154619
PCT Pub. Date: Aug. 15, 2019

(65) Prior Publication Data

US 2021/0108761 A1 Apr. 15, 2021

(30) Foreign Application Priority Data

Feb. 6, 2018 (EP) .................................... 18305122

(51) Int. Cl.
*F17C 7/02* (2006.01)
*F17C 5/02* (2006.01)

(52) U.S. Cl.
CPC .................. *F17C 7/02* (2013.01); *F17C 5/02* (2013.01); *F17C 2221/033* (2013.01);
(Continued)

(58) Field of Classification Search
CPC ........ F17C 2221/033; F17C 2223/0161; F17C 2223/0169; F17C 2223/033;
(Continued)

(56) References Cited

U.S. PATENT DOCUMENTS 5,954,101 A 9/1999 Drube et al.
9,261,236 B2 * 2/2016 Gates .............. G06Q 10/06316
(Continued)

FOREIGN PATENT DOCUMENTS

WO 99/28670 A1 6/1999
WO 2009/063127 A1 5/2009
WO 2010/059052 A1 5/2010

OTHER PUBLICATIONS

International Search Report of the International Searching Authority for PCT/EP2019/051490 dated Apr. 2, 2019.

*Primary Examiner* — Filip Zec
(74) *Attorney, Agent, or Firm* — MILLEN, WHITE, ZELANO & BRANIGAN, P.C.; Brion P. Heaney

(57) ABSTRACT

The present invention relates to a method and a system for supplying liquefied gas source tank (110) to a liquefied gas consumer tank (200) and/or liquefied gas consumer, wherein the liquefied gas is supplied via a transfer line (130, 140, 210) to the liquefied gas consumer tank (200) and/or the liquefied gas consumer, and wherein after having supplied liquefied gas to the liquefied gas consumer tank (200) and/or liquefied gas consumer, residual liquefied gas remaining in at least a part of the transfer line (130, 140, 210) is drained into a liquefied gas holding tank (120) and a pressurized gas is then fed into the liquefied gas holding tank (120) in order to return at least a part of the residual liquefied gas in the holding tank via a return line (160) back into the liquefied gas source tank (110).

18 Claims, 1 Drawing Sheet

(52) U.S. Cl.
CPC ........................... *F17C 2223/0161* (2013.01); *F17C 2223/033* (2013.01); *F17C 2223/047* (2013.01); *F17C 2225/0153* (2013.01); *F17C 2225/043* (2013.01); *F17C 2225/047* (2013.01); *F17C 2227/0107* (2013.01); *F17C 2227/044* (2013.01); *F17C 2250/01* (2013.01); *F17C 2260/035* (2013.01); *F17C 2265/037* (2013.01); *F17C 2265/065* (2013.01); *F17C 2270/011* (2013.01)

(58) Field of Classification Search
CPC ........ F17C 2223/047; F17C 2225/0153; F17C 2225/0161; F17C 2225/043; F17C 2225/047; F17C 2227/0107; F17C 2227/044; F17C 2250/01; F17C 2260/035; F17C 2260/044; F17C 2265/037; F17C 2265/065; F17C 2270/0105; F17C 2270/011; F17C 5/02; F17C 7/02; F17C 9/00
See application file for complete search history.

(56) References Cited

U.S. PATENT DOCUMENTS

| | | | | |
|---|---|---|---|---|
| 9,273,639 | B2 * | 3/2016 | Hyde | F02M 21/06 |
| 10,890,293 | B2 * | 1/2021 | Gustafson | F17C 7/02 |
| 2005/0274127 | A1 | 12/2005 | Drube et al. | |
| 2011/0179810 | A1 | 7/2011 | Sipilä et al. | |
| 2011/0232767 | A1 | 9/2011 | Liem et al. | |
| 2013/0240085 | A1 | 9/2013 | Hallot et al. | |
| 2014/0027008 | A1 | 1/2014 | Liem et al. | |
| 2014/0090750 | A1 | 4/2014 | Liem et al. | |

* cited by examiner

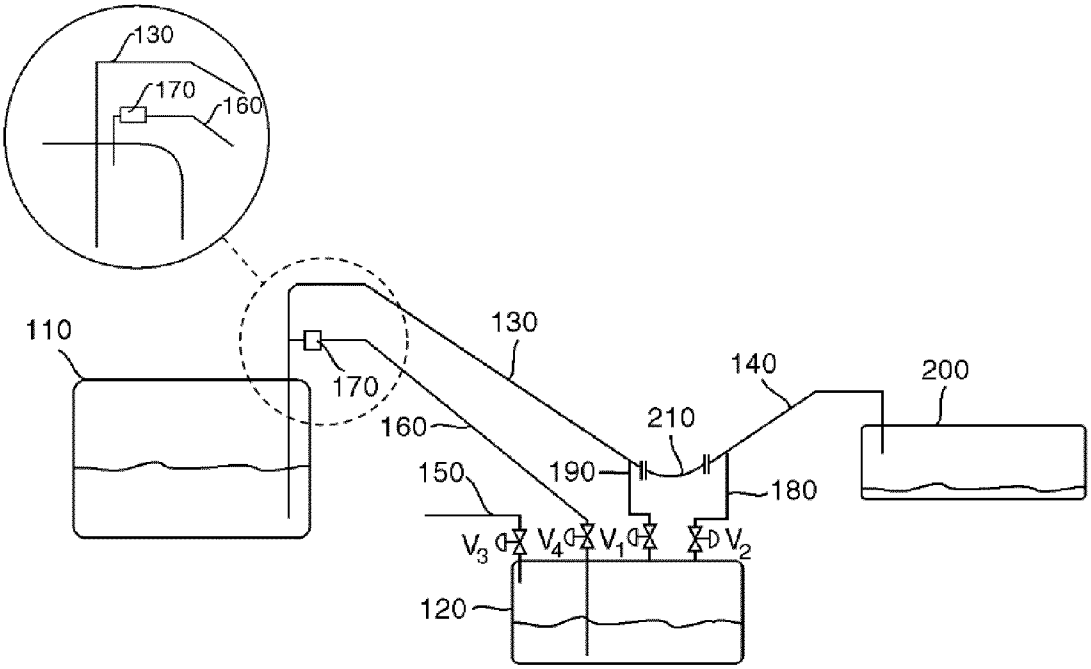
130
170
160
110
130
170
160
140
200
210
190
180
150
$V_3$
$V_4$
$V_1$
$V_2$
120

METHOD AND SYSTEM FOR SUPPLYING LIQUEFIED GAS

The present invention relates to a method and a system of supplying liquefied gas from a liquefied gas source tank to a liquefied gas consumer tank and/or liquefied gas consumer. It is of particular reference and benefit to the supply of liquefied fuel gas from a source of liquefied natural gas (LNG), especially in ocean-going tankers and other barges or boats. The present invention is primarily described herein with the reference to this application. It is, however, to be understood that it is also applicable to other cryogenic liquids or liquid mixtures, and especially to tanks containing such cryogenic liquids or liquid mixtures, which tanks and/or their pipework need to be purged by an inert gas after having withdrawn at least a part of its liquefied gas content.

A typical exemplary arrangement which can be regarded a starting point for the present invention, comprises an elevated LNG fuel tank on a deck of a river barge, which tank is used as a source tank to fill a secondary tank on a pusher tug or similar boat. The elevation of the source tank means that the temporary flexible connection between the two vessels is placed at a lower level than the main source tank. During bunkering, liquefied gas is withdrawn from the source tank vessel by means of a liquefied gas pump and conducted through a transfer line. After bunkering has taken place, the transfer line from the top of the LNG source tank will be filled with LNG. It is necessary to remove the LNG fuel and purge with inert gas prior to a disconnection of the flexible coupling. A rapid removal is necessary to avoid unnecessary delays in vessel operations particularly also because regulations will not allow the transfer of LNG during navigation. The LNG in the transfer line will vaporize and the LNG fuel source tank, however, cannot contain the volume of boil-off gas which will result if the LNG is allowed to vaporize in the line. It would then be necessary to dispose of the additional volume of gas which cannot be contained within the LNG source tank.

It is therefore an object of the present invention to provide an efficient method and a corresponding system for providing liquefied gas from a liquefied gas source tank to a consumer and/or consumer tank avoiding the above disadvantages, especially when purging is necessary after having supplied the liquefied gas.

SUMMARY OF THE PRESENT INVENTION

According to the present invention there is provided a method for supplying liquefied gas from a liquefied gas source tank to a consumer and/or consumer tank, and a corresponding system according to the independent claims. Preferred embodiments are given in the respective dependent claims and the following description.

According to the present invention there is provided a method of supplying liquefied gas from a liquefied gas source tank to a liquefied gas consumer/liquefied gas consumer tank, wherein the liquefied gas is first supplied via a transfer line to the liquefied gas consumer tank/liquefied gas consumer, and wherein after having supplied liquefied gas to the liquefied gas consumer tank/liquefied gas consumer, residual liquefied gas remaining in at least a part of the transfer line is drained into a liquefied gas holding tank and a pressurized gas is then fed into the liquefied gas holding tank in order to return at least a part of the residual liquefied gas in the holding tank via a return line back into the liquefied gas source tank.

Typically, by way of example, the liquefied gas source tank is an LNG fuel storage tank typically located on the deck of a river barge. LNG fuel is withdrawn from the source tank and conducted to a consumer tank, typically and again by way of example only, a small LNG fuel tank on a pusher tug. It can also be considered to conduct the LNG fuel directly to an LNG consumer like a fuel engine e.g. for the propulsion of the pusher tug itself. The liquefied gas holding tank can be a simple type of sump pot with sufficient volume to contain the contents of all pipework above it.

After having supplied liquefied gas to the consumer/consumer tank it is advantageous to completely drain the pipework before liquid begins to vaporize. To this end, residual liquefied gas remaining in at least a part of the transfer line is drained via at least one drain line into the liquefied gas holding tank. After draining is completed, a pressurized gas like pressurized inert gas or boil-off gas is fed into the liquefied gas holding tank at a pressure level sufficient to return at least a part, preferably the main part, more preferably essentially all of the liquefied gas in the holding tank via the return line back into the liquefied gas source tank.

The following advantages and improvements are achieved by the present invention.

The motive power to return the remaining liquefied gas to the source tank is provided by pressurized inert gas or boil-off gas such that installation of a pump is avoided. The simple removal of residual liquid reduces the need for additional boil-off gas handling. The removal of LNG/liquefied gas before its vaporization will reduce the amount of purging gas consumed. Priming and starting of a cryogenic pump in a small vessel like the holding tank would be difficult to control. Pump cool down time is avoided. A pump would lose prime as the level drops, causing it to trip, leaving a certain amount of liquid which cannot be removed. The system according to the present invention only requires simple valves and control system.

The system for supplying liquefied gas from a liquefied gas source tank to a liquefied gas consumer tank and/or liquefied gas consumer according to the present invention comprises the liquefied gas source tank having liquefied gas stored therein, a transfer line connecting a liquid space of the source tank with the liquefied gas consumer tank and/or the liquefied gas consumer. The system further comprises a liquefied gas holding tank connected to the transfer line for draining residual liquefied gas remaining in at least a part of the transfer line after having supplied liquefied gas to the consumer tank/consumer into the liquefied gas holding tank, a pressurized gas feeding line connected to the liquefied gas holding tank for feeding pressurized gas into the liquefied gas holding tank, and a return line connecting the liquefied gas holding tank with the liquefied gas source tank for feeding residual liquefied gas from the liquefied gas holding tank back to the liquefied gas source tank. The above method according to the present invention is preferably performed with the above system according to the second aspect of the present invention.

Regarding advantages and embodiments of the system according to the present invention reference is explicitly made to the statements in connection with the method according to the present invention and vice versa.

In a preferred embodiment of the present invention, the transfer line is connected to the liquefied gas holding tank via at least one drain line. Residual liquefied gas remaining in at least a part of the transfer line can be drained into the liquefied gas holding tank via the at least one drain line. One single drain line is sufficient, especially if placed low enough to drain the whole transfer line.

In a preferred embodiment of the present invention, the transfer line comprises a first transfer line and a second transfer line connected by a connection member, particularly a removable flexible connection member. In this embodiment, the first transfer line can particularly be a line from the source tank to a place where the holding tank is located, and the second transfer line can be a line from the place where the holding tank is located to the consumer tank/consumer.

In this embodiment it is advantageous to have a first drain line connecting the first transfer line to the liquefied gas holding tank, and to have a second drain line connecting the second transfer line to the liquefied gas holding tank. After having supplied liquefied gas to the gas consumer/consumer tank, liquefied gas remaining in the pipework can be drained through the first and second drain lines into the holding tank. It is expedient to connect the lowest points of each of the first and second transfer lines to the liquefied gas holding tank via the first and second drain lines, respectively.

Again, one single drain line might be sufficient if placed low enough to drain the connection line, i.e. the connection member, which is advantageously placed at the lowest point of or at least partly even lower than the first and second transfer lines. When using two drain lines, the above second drain line connecting the holding tank and the consumer tank should have to have its own removable flexible connection.

In this embodiment, the first drain line preferably comprises a first valve and the second drain line preferably comprises a second valve which valves are closed during the supply of liquefied gas and are open during draining.

The return line and the transfer line can, in part, share the same line. It is, for example, possible to use the first drain line and the first transfer line as the return line. In this case, no separate return line is necessary. The return line would then have to extend to the bottom, i.e. liquid space, of the holding tank. In another preferred embodiment, a separate return line is provided connecting the liquid space of the holding tank with the source tank. In this embodiment, the return line can be connected to the ullage space of the source tank or be connected to the first transfer line especially at the entry to the source tank.

In a preferred embodiment, the pressurized gas is fed into the liquefied gas holding tank via a pressurized gas feeding line connected to the ullage space of the holding tank. Accordingly, the pressurized gas feeding line comprises a third valve which is open when pressurized gas is fed into the holding tank.

Draining becomes more efficient if the liquefied gas holding tank is located at a lower level with respect to the source tank and/or with respect to the consumer tank and/or the consumer.

It is expedient to use an inert gas and/or boil-off gas as the pressurized gas. Inert gas can be supplied at the necessary pressure, boil-off gas from the ullage space of the source tank will have to be pressurized to the necessary pressure by means of appropriate compressors.

In a preferred embodiment, after having returned the liquefied gas, i.e. the residual liquid back into the source tank, the holding tank and optionally at least a part of the first and second transfer lines and of the return line are purged with a second inert gas which can be the same as the first inert gas used as the pressurized gas.

Further advantages and preferred embodiments of the invention are disclosed in the following description and figures.

It is understood by a person skilled in the art that the preceding and the following features are not only disclosed in the detailed combinations as discussed or shown in a figure, but that also other combinations of features can be used without exceeding the scope of the present invention.

The invention will now be further described with reference to the accompanying drawing showing a preferred embodiment.

BRIEF DESCRIPTION OF THE DRAWING

FIG. 1 schematically shows an embodiment of a system according to the present invention for implementing the method according to the present invention.

DETAILED DESCRIPTION OF THE DRAWING

The embodiment shown in FIG. 1 relates to an application of supplying fuel gas from an LNG source tank, but it is appreciated that a person skilled in the art can easily transfer this embodiment to other applications involving other cryogenic liquids or liquid mixtures.

FIG. 1 schematically shows a system 100 for supplying LNG from a source tank 110 to a consumer tank 200. The source tank 110 may be installed on the deck of a river barge, while the consumer tank 200 may be a small tank on a pusher tug. Typically, the small tank on the pusher tug is filled quickly every two days from the LNG source tank 110. After pumping any liquid in a downward sloping or flexible pipe or hose, there is inevitably liquid remaining in the pipework after the process is stopped. Since LNG will vaporize and the LNG source tank 110 cannot contain the volume of boil-off gas which will result if the LNG is allowed to vaporize in the line, it is desirable to return liquid instead of gas back to the original tank 110.

To solve this problem, the system 100 according to FIG. 1 provides a small holding tank 120 which may be a simple type of sump pot with sufficient volume to contain the contents of all pipework connected to it and with a series of inlet and discharge control valves and a control supply of pressurized gas to provide the motive power to push all residual liquid in the holding tank 120 back to the top of the LNG fuel tank 110.

A sequence of valve openings and closings will allow accumulation of the residual liquid prior to removal of the same and later inert gas purging.

In more detail, the system 100 according to the embodiment of FIG. 1 comprises a transfer line 130, 140, 210 for supplying the consumer tank 200 with LNG. In order to easily connect and disconnect the consumer tank 200 to the source tank 110, the transfer line comprises two parts connected by a connection member 210, namely a first transfer line 130 and a second transfer line 140 connected by the connection member 210 which preferably is flexible and removable. In order to be able to easily remove residual LNG from the first and second transfer lines 130 and 140, at lower ends of the transfer lines, preferably at the lowest ends, drain lines 190 and 180 are connected. The drain lines 190 and 180 end in a liquefied gas holding tank 120 where the residual LNG is collected. Valves V1 and V2 in the drain lines 190 and 180 are open during draining.

As can be seen from FIG. 1, the first transfer line 130 extends from the source tank 110 to the holding tank 120, more precisely to the first drain line 190 at the top of the vessel, and the second transfer line 140 extends from the consumer tank 200 to the holding tank 120, more precisely to the second drain line 180 at the top of the vessel. The second drain line 180 comprises a removable flexible connection (not shown) for disconnecting the second drain line 180 from the holding tank 120.

The liquefied gas holding tank 120 comprises a valve V1 on the first drain line inlet at the top of the vessel, a valve V2 at the second drain line inlet at the top of the vessel, and a valve V3 in the pressurized gas feeding line 150 connected to the vapor space of the holding tank 120.

After the bunkering process is completed, valves V1 and V2 are opened and residual liquid will thus accumulate in the small holding tank 120.

During bunkering, in this embodiment LNG at approximately −155 degree Celsius will be pumped from the source tank 110 (original storage tank) to the receiving consumer fuel tank 200 at a flow in the range of approximately 5 to 20 $m^3/h$ at a pressure of 1 to 10 bar to overcome any pressure in the receiving tank 200. Lower pressures are preferable for reducing the risk for leaks and product loss in case of a leak. During the bunkering process, valves V1 and V2 and V3 are closed. LNG is conducted through the first transfer line 130, the connection member 210 and the second transfer line 140 to the receiving tank 200.

After pumping, ambient temperatures will tend to vaporize the liquid remaining in the pipework. Since LNG has a vapor to liquid ratio of approximately 600:1 it is preferable to return the liquid to the source tank 110 before it vaporizes. After pumping has stopped, the pressure in the source tank 110, pipework and receiving fuel tank 200 will settle-out to a value lower than the highest pressure of the tank-pipework-tank-network. The liquid remaining in the pipework, typically in the range of 200 l, will run down to the lowest point and—with valves V1 and V2 open—collect in a suitably sized drain pot in the form of the small holding tank 120.

In this embodiment, the top of the source tank 110 is approximately 5 m above the lowest point of the pipework. Thus, in order to raise the liquid column from the lower point of the holding tank 120 to the top of the source tank 110, a pressurized gas supply of approximately 5 bar through the pressurized gas feeding line 150 with valve V3 open should be sufficient, as the density of LNG is in the order of 0.5 $kg/m^3$.

Alternatively, compressed boil-off gas from the ullage space of source tank 110 can be used instead of pressurized inert gas.

Introducing inert gas of sufficient pressure through line 150 into the holding tank 120 will thus return most of the liquid in the holding tank 120 back to the source tank 110 through the return line 160 (valve V4 open). During pressurization via line 150 valve V4 remains closed. The entry of the return line 160 to the storage tank 110 can either be separate from the first transfer line 130 such that the return line 160 is connected to the ullage space of the storage tank 110, or it can be connected to the entry of the first transfer line 130 to the storage tank 110. Both alternatives are shown in FIG. 1.

Further, the return line 160 is fitted with an orifice 170 at a high level to avoid two-phase flow of the return liquid back to the source tank 110.

The solution described provides a method to completely drain the pipework of system 100 before LNG starts to vaporize. The described solution avoids the need for a pump and relies on simple valve control and compressed inert gas supply.

The invention claimed is:

1. A method of supplying liquefied gas from a liquefied gas source tank (110) to a liquefied gas consumer tank (200) and/or liquefied gas consumer, wherein the liquefied gas is supplied via a transfer line (130, 140, 210) to the liquefied gas consumer tank (200) and/or the liquefied gas consumer, and wherein after having supplied liquefied gas to the liquefied gas consumer tank (200) and/or liquefied gas consumer, residual liquefied gas remaining in at least a part of the transfer line (130, 140, 210) is drained into a liquefied gas holding tank (120) and a pressurized gas is then fed into the liquefied gas holding tank (120) in order to return at least a part of the residual liquefied gas in the holding tank via a return line (160) back into the liquefied gas source tank (110).

2. The method of claim 1, wherein the residual liquefied gas remaining in at least a part of the transfer line is drained into the liquefied gas holding tank (120) via at least one drain line (180, 190).

3. The method of claim 1, wherein the pressurized gas is fed into the liquefied gas holding tank (120) via a pressurized gas feeding line (150) connected to the ullage space of the liquefied gas holding tank (120).

4. The method of claim 1, wherein a first inert gas and/or boil-off gas from the liquefied gas source tank (110) is used as the pressurized gas.

5. The method of claim 1, wherein residual liquefied gas is returned to the liquefied gas source tank (110) via the return line (160) connected to the liquid space of the liquefied gas holding tank (120).

6. The method of claim 1, wherein after having returned the residual liquefied gas back into the liquefied gas source tank (110), the liquefied gas holding tank (120) is purged with a second inert gas.

7. The method according to claim 1, wherein the liquefied gas is liquefied natural gas.

8. A system (100) for supplying liquefied gas from a liquefied gas source tank (110) to a liquefied gas consumer tank (200) and/or a liquefied gas consumer, said system comprising the liquefied gas source tank (110) having liquefied gas stored therein, a transfer line (130, 140, 210) connecting a liquid space of the source tank with the liquefied gas consumer tank (200) and/or the liquefied gas consumer, wherein the system (100) further comprises a liquefied gas holding tank (120) connected to the transfer line (130, 140, 210) for draining residual liquefied gas remaining in at least a part of the transfer line (130, 140, 210) after having supplied liquefied gas to the consumer tank (200) and/or consumer into the liquefied gas holding tank (120), a pressurized gas feeding line (150) connected to the liquefied gas holding tank (120) for feeding pressurized gas into the liquefied gas holding tank (120), and a return line (160) connecting the liquefied gas holding tank (120) with the liquefied gas source tank (110) for feeding residual liquefied gas from the liquefied gas holding tank (120) back to the liquefied gas source tank (110).

9. The system (100) of claim 8, wherein the transfer line (120, 130, 210) is connected to the liquefied gas holding tank (120) via at least one drain line (180, 190).

10. The system (100) of claim 8, wherein the transfer line comprises a first transfer line (130) and a second transfer line (140) connected by a connection member (210).

11. The system (100) of claim 10, wherein the connection member (210) is a flexible connection member.

12. The system of claim 9 wherein the transfer line comprises a first transfer line (130) and a second transfer line (140) connected by a connection member (210), and the at least one drain line comprises a first drain line (190) connecting the first transfer line (130) to the liquefied gas holding tank (120), and a second drain line (180) connecting the second transfer line (140) to the liquefied gas holding tank (120).

13. The system (100) of claim 12, wherein the first drain line (190) comprises a first valve (V1) and the second drain line (180) comprises a second valve (V2).

14. The system (100) of claim 8, wherein the pressurized gas feeding line (150) comprises a third valve (V3).

15. The system (100) of claim 8, wherein the return line (160) comprises a fourth valve (V4) and/or an orifice (170).

16. The system (100) of claim 8, wherein the transfer line (120, 130, 210) and the return line (160), in part, share the same line.

17. The system (100) of claim 8, wherein the liquefied gas holding tank (120) is located at a lower level with respect to the source tank (110) and/or with respect to the consumer tank (200) and/or the consumer.

18. The system of claim 9, wherein the connection member (210) is a flexible connection member, and the at least one drain line comprises a first drain line (190) connecting the first transfer line (130) to the liquefied gas holding tank (120), and a second drain line (180) connecting the second transfer line (140) to the liquefied gas holding tank (120).

* * * * *